(12) United States Patent
Matsumoto et al.

(10) Patent No.: US 9,927,153 B2
(45) Date of Patent: Mar. 27, 2018

(54) HEAT EXCHANGER AND HEAT PUMP SYSTEM USING SAME

(71) Applicant: SANDEN HOLDINGS CORPORATION, Gunma (JP)

(72) Inventors: Yuuichi Matsumoto, Gunma (JP); Shinji Kouno, Gunma (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 150 days.

(21) Appl. No.: 14/652,010

(22) PCT Filed: Dec. 4, 2013

(86) PCT No.: PCT/JP2013/082528
§ 371 (c)(1),
(2) Date: Jun. 12, 2015

(87) PCT Pub. No.: WO2014/091972
PCT Pub. Date: Jun. 19, 2014

(65) Prior Publication Data
US 2015/0323225 A1    Nov. 12, 2015

(30) Foreign Application Priority Data
Dec. 12, 2012  (JP) .................................. 2012-271309

(51) Int. Cl.
*F25B 13/00*     (2006.01)
*F25B 5/04*      (2006.01)
(Continued)

(52) U.S. Cl.
CPC .......... *F25B 13/00* (2013.01); *B60H 1/00921* (2013.01); *B60H 1/3227* (2013.01);
(Continued)

(58) Field of Classification Search
CPC ........ F25B 2339/044; F25B 2339/0444; F25B 2339/0445; F25B 2339/0446; F25B 40/02;
(Continued)

(56) References Cited

U.S. PATENT DOCUMENTS 1,618,485 A * 2/1927 Skinner ............... F28D 1/05383
165/151
5,056,327 A * 10/1991 Lammert .............. F25B 47/022
62/151
(Continued)

FOREIGN PATENT DOCUMENTS

CN         101545690      4/2011
EP          2716478       4/2014
(Continued)

OTHER PUBLICATIONS

Office Action dated Dec. 15, 2016 which issued in the corresponding Chinese Patent Application No. 201380064339.1.
(Continued)

*Primary Examiner* — Orlando E Aviles Bosques
(74) *Attorney, Agent, or Firm* — Cozen O'Connor

(57) ABSTRACT

A main core portion (6) performing heat exchange between air and a refrigerant, a receiver tank (8) into which the refrigerant having flowed through the main core portion flows, a sub-cool core portion (10) for sub-cooling a liquid refrigerant having flowed through the receiver tank by heat exchange with air, a first flow path (36*b*, 68, 78) through which a refrigerant flows in order of the main core portion, the receiver tank, and the sub-cool core portion, a second flow path (36*a*, 36*c*, 68, 72) through which the refrigerant flows in order of the main core portion and the sub-cool core portion by bypassing the receiver tank, and flow-path
(Continued)

switching means (82) for switching between the first flow path and the second flow path.

5 Claims, 2 Drawing Sheets

(51) Int. Cl.
| | | |
|---|---|---|
| F25B 6/00 | (2006.01) | |
| F25B 39/00 | (2006.01) | |
| F25B 49/02 | (2006.01) | |
| B60H 1/00 | (2006.01) | |
| B60H 1/32 | (2006.01) | |
| F28F 27/02 | (2006.01) | |
| F28D 1/053 | (2006.01) | |
| F28F 9/26 | (2006.01) | |
| F28D 1/04 | (2006.01) | |
| F25B 40/00 | (2006.01) | |
| F25B 47/02 | (2006.01) | |
| F28D 21/00 | (2006.01) | |

(52) U.S. Cl.
CPC ............... *F25B 5/04* (2013.01); *F25B 6/00* (2013.01); *F25B 39/00* (2013.01); *F25B 49/02* (2013.01); *F28D 1/0417* (2013.01); *F28D 1/05375* (2013.01); *F28F 9/262* (2013.01); *F28F 27/02* (2013.01); *F25B 40/00* (2013.01); *F25B 47/022* (2013.01); *F25B 2400/0403* (2013.01); *F25B 2400/0409* (2013.01); *F25B 2400/0411* (2013.01); *F25B 2600/2501* (2013.01); *F28D 2021/0084* (2013.01)

(58) Field of Classification Search
CPC ............ F25B 47/022; F25B 2600/2501; F28D 1/0417; F28F 9/262
See application file for complete search history.

(56) References Cited

U.S. PATENT DOCUMENTS

| | | | | |
|---|---|---|---|---|
| 5,101,640 | A * | 4/1992 | Fukushima | ............ F25B 49/027 |
| | | | | 165/101 |
| 5,473,906 | A * | 12/1995 | Hara | .................. B60H 1/00007 |
| | | | | 62/324.6 |
| 5,813,249 | A * | 9/1998 | Matsuo | ................. B60H 1/3229 |
| | | | | 165/132 |
| 8,250,874 | B2 | 8/2012 | Ikegami et al. | |
| 2004/0118150 | A1* | 6/2004 | Yamada | ................... F25B 39/04 |
| | | | | 62/512 |
| 2009/0241573 | A1* | 10/2009 | Ikegami | ............. B60H 1/00335 |
| | | | | 62/238.7 |
| 2014/0245777 | A1* | 9/2014 | Katoh | .................... F28F 9/0204 |
| | | | | 62/515 |

FOREIGN PATENT DOCUMENTS

| | | |
|---|---|---|
| JP | 07-332807 | 12/1995 |
| JP | 10-6763 | 1/1998 |
| JP | 2010-6763 | 1/1998 |
| JP | 11-211276 | 8/1999 |
| JP | 2005-114353 | 4/2005 |
| JP | 4-052706 | 2/2008 |
| JP | 2009-023564 | 2/2009 |
| JP | 2011-33289 | 2/2011 |
| JP | 2011-033289 | 2/2011 |
| JP | 2012-225634 | 11/2012 |
| JP | 2012-225638 | 11/2012 |
| WO | WO 2012/160735 | 11/2012 |

OTHER PUBLICATIONS

Office Action dated Nov. 21, 2016 which issued in the corresponding German Patent Application No. 112013005932.0.

* cited by examiner

← DURING COOLING
←--- DURING HEATING
←-·- DURING DEHUMIDIFICATION
←--·- DURING DEFROSTING

HEAT EXCHANGER AND HEAT PUMP SYSTEM USING SAME

RELATED APPLICATIONS

This is a U.S. National Phase Application under 35 USC 371 of International Application PCT/JP2013/082528 on Dec. 4, 2013.

This application claims the priority of Japanese Application No. 2012-271309 filed Dec. 12, 2012, the entire content of which is hereby incorporated by reference.

TECHNICAL FIELD

The present invention relates to a heat exchanger and a heat pump system using the same and relates to a heat exchanger and a heat pump system using the same having functions of both a condenser and an evaporator and used as an outdoor heat exchanger of an air-conditioning heat pump system.

BACKGROUND ART

As an outdoor heat exchanger used in a heat pump system for a vehicle air-conditioning and the like, a sub-cool system condenser is disclosed, including a main core (condenser core) portion for condensing a refrigerant by heat exchange with air, a receiver tank into which the refrigerant having flowed through the main core portion is made to flow, and a sub-cool core portion for over-cooling and liquefying a gas/liquid mixed refrigerant having flowed through the receiver tank by heat exchange with the air (see Patent Literature 1, for example).

Each of the main core portion and the sub-cool core portion is constituted by a plurality of tubes causing a pair of header tanks communicate with each other, arranged at an interval in a state in parallel with each other and a fin arranged between the adjacent tubes, for example.

PRIOR ART DOCUMENT

Patent Document

Patent Document 1: Japanese Patent No. 4052706

SUMMARY OF THE INVENTION

Problems to be Solved by the Invention

If a heat exchanger including the main core portion and the sub-cool core portion as in the above-described prior-art technology is used for an outdoor heat exchanger of a heat-pump type air-conditioning device capable of performing both cooling and heating, when it is used as a condenser during a cooling operation, the refrigerant can be sufficiently cooled in the sub-cool core portion.

However, if the above-described heat exchanger is used as an evaporator during a heating operation, evaporation of the refrigerant is possible by heat absorption in the main core portion, but since the refrigerant is made to flow both through the main core portion and the sub-cool core portion, a pressure loss in refrigerant flowing is large, and there is a concern that a heating capability might be deteriorated.

Thus, it can be considered that the refrigerant is made to bypass the sub-cool core portion and to flow only through the main core portion during the heating operation. However, in this case, a heat absorption area in the sub-cool core portion from the refrigerant to an outside air becomes zero, or in other words, since a heat exchange area in the outdoor heat exchanger during heating is reduced, a problem still remains in improvement of the heating capability.

Moreover, the heat exchanger of the above-described prior-art technology is used only as a condenser, and a heat exchanger having functions of both a condenser and an evaporator is not assumed. Therefore, special consideration is not given to flow directions of the refrigerants in the main core portion and the sub-cool core portion or an operation for defrosting the main core portion and the sub-cool core portion, and a problem still remains in simplification of a heat exchanger and a refrigerant circuit in which the heat exchanger is incorporated and realization of a defrosting operation with high energy efficiency.

An object of the present invention is to provide a heat exchanger suitable for an outdoor heat exchanger of a heat pump system having functions of both a condenser and an evaporator and improved heating performance by improving both a pressure loss and a heat absorption loss in refrigerant flowing during heating so as to simplify a heat exchanger and a refrigerant circuit in which the heat exchanger is incorporated and a heat pump system using the heat exchanger and realizing a defrosting operation with high energy efficiency.

Means for Solving the Problems

In order to achieve the above-described object, a heat exchanger of the present invention includes a main core portion for performing heat exchange between air and a refrigerant, a receiver tank into which the refrigerant having flowed through the main core portion flows, a sub-cool core portion for sub-cooling a liquid refrigerant having flowed through the receiver tank by heat exchange with the air, a first flow path through which the refrigerant is made to flow in order of the main core portion, the receiver tank, and the sub-cool core portion, a second flow path through which the refrigerant is made to flow in order of the main core portion and the sub-cool core portion by bypassing the receiver tank, and flow-path switching means for switching between the first flow path and the second flow path.

Preferably, flow directions of the refrigerants in the main core portion and the sub-cool core portion of the first flow path and the second flow path are the same.

Preferably, each of the main core portion and the sub-cool core portion has a pair of header tanks arranged away from each other in a vertical direction, a plurality of tubes arranged so as to extend in the vertical direction between the header tanks and to cause the pair of header tanks to communicate with each other, and a fin provided in the tube.

Preferably, the main core portion and the sub-cool core portion are arranged adjacent to each other.

Preferably, the receiver tank has one connecting member having a first communication hole made to communicate with the header tank and a second communication hole made to communicate with the first flow path.

Moreover, the heat pump system of the present invention is used by switching any one of the above-described heat exchangers to a condenser or an evaporator, and when the heat exchanger is used as a condenser, the refrigerant is made to flow through the first flow path by the flow-path switching means, while when the heat exchanger is used as an evaporator, the refrigerant is made to flow through the second flow path by the flow-path switching means.

Preferably, when the main core portion and the sub-cool core portion are to be defrosted, the refrigerant is made flow through the second flow path by the flow-path switching means.

Preferably, the heat exchanger is used as an outdoor heat exchanger of an air-conditioning device for a vehicle.

Advantageous Effects of the Invention

According to the heat exchanger of the present invention, by switching the flow path to the second flow path, by bypassing only the receiver tank in the heat exchanger, and by allowing the refrigerant to flow through the main core portion and the sub-cool core portion in order, a pressure loss involved in fluidity of the refrigerant can be effectively suppressed while a heat exchange area between the refrigerant and the air in the sub-cool core portion is ensured and thus, heat exchange efficiency of the heat exchanger can be largely improved.

Moreover, by making the refrigerant flow directions the same in the main core portion and the sub-cool core portion of the first flow path and the second flow path, the heat exchanger and a refrigerant circuit in which the heat exchanger is incorporated can be largely simplified.

Moreover, each of the main core portion and the sub-cool core portion is specifically constituted by a pair of header tanks arranged away from each other in the vertical direction, a plurality of the tubes arranged so as to extend in the vertical direction between the header tanks and to cause the pair of header tanks to communicate with each other, and the fin provided in the tube. As a result, occurrences of frosting and icing phenomena in the tubes can be suppressed, and deterioration of the heat exchange efficiency between the air and the refrigerant in the main core portion and the sub-cool core portion can be suppressed.

Moreover, by arranging the main core portion and the sub-cool core portion adjacent to each other, manufacture of the heat exchanger is facilitated, a component cost can be reduced, and a structure of the heat exchanger can be simplified.

Moreover, since the receiver tank includes one connecting member having a first communication hole communicating with the header tank and a second communication hole communicating with the first flow path, the header tank and the first flow path can be made to communicate with the receiver tank by the one member and thus, manufacture of the heat exchanger can be further facilitated, the component cost can be further reduced, and the structure of the heat exchanger can be further simplified.

On the other hand, according to the heat pump system of the present invention, specifically, when any of the above-described heat exchangers is used as a condenser, the refrigerant is made to flow through the first flow path by the flow-path switching means, while when the heat exchanger is used as an evaporator, the refrigerant is made to flow through the second flow path by the flow-path switching means.

Moreover, by making the refrigerant flow through the second flow path by the flow-path switching means when the main core portion and the sub-cool core portion are to be defrosted, the receiver tank is bypassed in the heat exchanger and thus, a heat energy loss of the refrigerant in the receiver tank during a defrosting operation is prevented, which contributes to further improvement of the heat exchange efficiency of the heat exchanger.

Moreover, such heat exchanger is preferably used as an outdoor heat exchanger of an air-conditioning device for a vehicle.

MODE FOR CARRYING OUT THE INVENTION

A heat exchanger according to an embodiment of the present invention and a heat pump system using the same will be described below by referring to the attached drawings.

Figure 1:
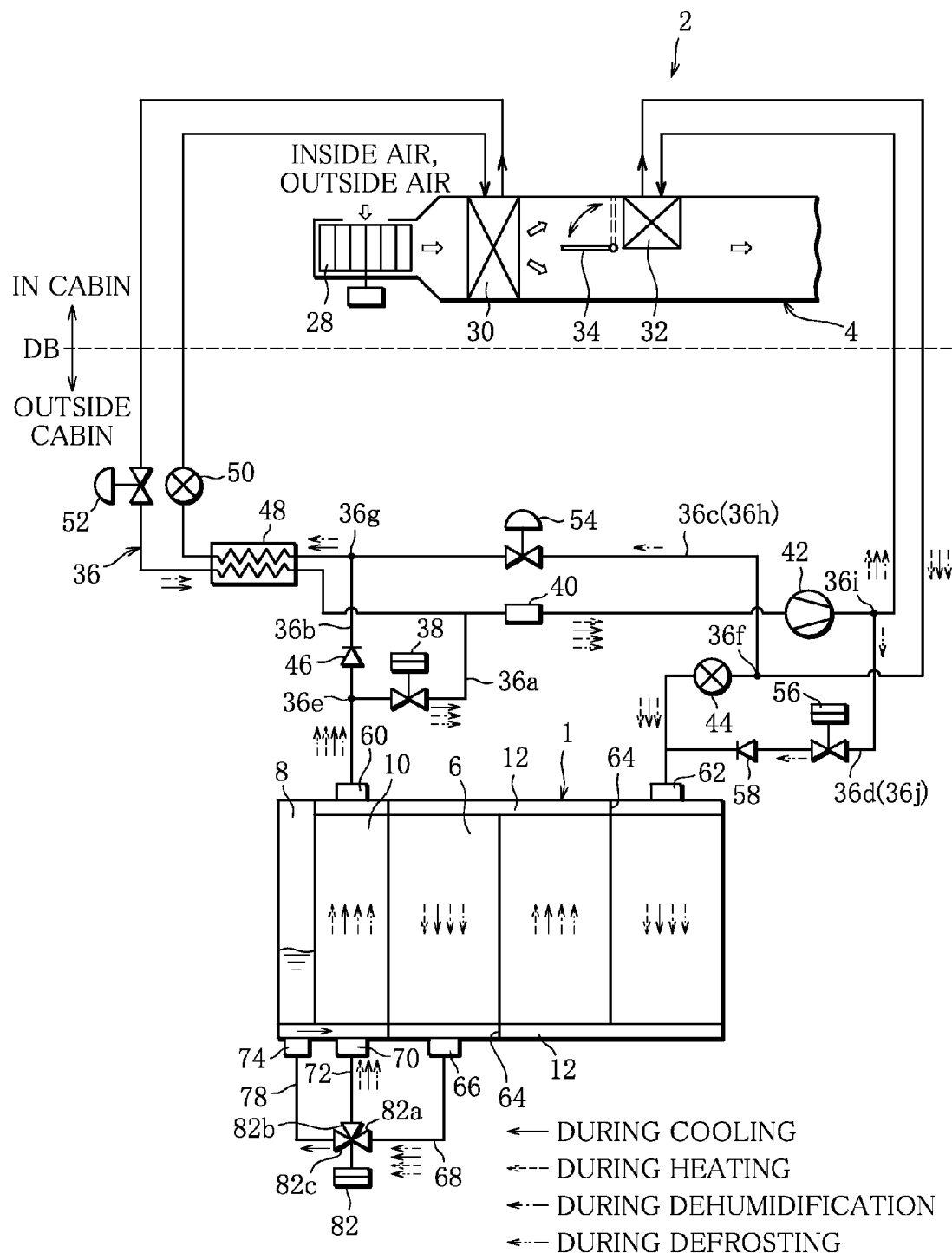
FIG. 1 is a view illustrating an outline constitution of a heat pump system for vehicle air-conditioning according to an embodiment of the present invention and an HVAC unit.
Figure 2:
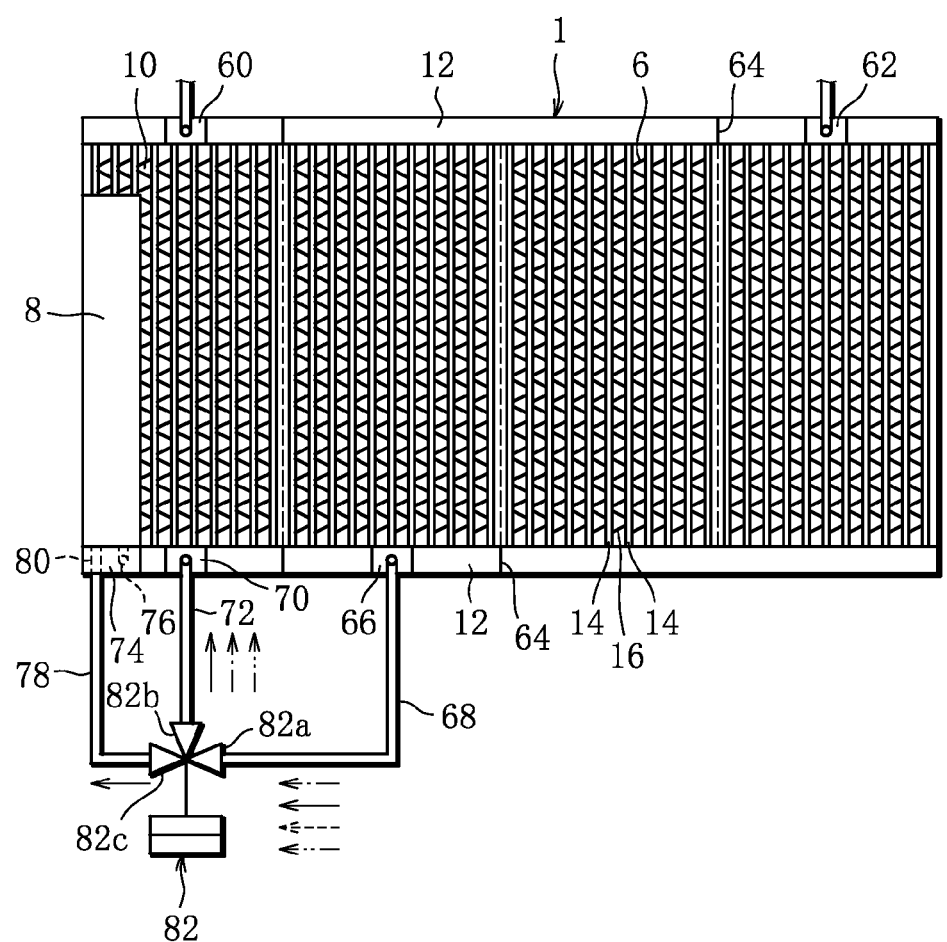
FIG. 2 is a front view illustrating a structure of an outdoor heat exchanger in FIG. 1.

FIG. 1 illustrates an outline constitution of a heat pump system 2 for vehicle air-conditioning in which an outdoor heat exchanger (heat exchanger) 1 is incorporated and an HVAC (Heating Ventilation & Air Conditioning) unit 4 to which the heat pump system 2 is connected, and FIG. 2 is a front view illustrating a structure of the outdoor heat exchanger 1.

As illustrated in FIGS. 1 and 2, the outdoor heat exchanger 1 includes a main core portion 6 performing heat exchange between air and a refrigerant, a receiver tank 8 into which the refrigerant having flowed through the main core portion 6 flows, and a sub-cool core portion 10 for sub-cooling a liquid refrigerant having flowed through the receiver tank 8 by heat exchange with the air.

Each of the main core portion 6 and the sub-cool core portion 10 has a pair of header tanks 12 and 12 arranged away from each other in a vertical direction in a state parallel with each other, a plurality of tubes 14 arranged so as to extend in the vertical direction between the header tanks 12 and 12 and to communicate with both of the upper and lower header tanks 12 and 12, and a fin 16 arranged between the adjacent tubes 14, and the main core portion 6 and the sub-cool core portion 10 adjacently constitute a heat exchange core having an integral structure.

The receiver tank 8 is arranged and fixed adjacent to a left front side of the sub-cool core portion 10 in FIGS. 1 and 2, and the heat exchange core constituted by the main core portion 6 and the sub-cool core portion 10 constitutes the outdoor heat exchanger 1 having the integral structure together with the receiver tank 8.

The HVAC unit 4 is mounted on a front side in a cabin of a vehicle and fixed to an inner side of the cabin of a dash panel DB sectioning an engine room of the vehicle from an inside of the cabin. In the HVAC unit 4, a blower fan 28, an indoor evaporator 30, and an indoor condenser 32 are internally provided in order from a flow direction of the air. A damper 34 for opening/closing an air inlet into the indoor condenser 32 is provided on an upstream side of an air flow in the indoor condenser 32, and the air can be made to flow by bypassing the indoor condenser 32 by closing the damper 34 as indicated by a broken line in FIG. 1.

The heat pump system 2 has a refrigerant circuit configuration in which the flow directions of the refrigerants in the main core portion 6 and the sub-cool core portion 10 are the same and the outdoor heat exchanger 1 can be used as the condenser or the evaporator by switching, and the outdoor heat exchanger 1 is used as an evaporator during a heating operation of the heat pump system 2 and is used as a condenser during a cooling operation.

In more detail, the heat pump system 2 includes a refrigerant circuit 36 through which the refrigerant is circulated, and a heating-operation flow path (second flow path) 36a in the refrigerant circuit 36 forms a refrigerant flow path flowing in order of the outdoor heat exchanger 1, a first opening/closing valve 38, an accumulator 40, a compressor 42, the indoor condenser 32, and a first expansion valve 44 in the refrigerant flow direction and returning to the outdoor heat exchanger 1 as indicated by broken-line arrows in FIG. 1.

On the other hand, a cooling-operation flow path (first flow path) 36b in the refrigerant circuit 36 forms a refrigerant flow path flowing in order of the outdoor heat exchanger 1, a first check valve 46, an internal heat exchanger 48, a second expansion valve 50, the indoor evaporator 30, the second opening/closing valve 52, the internal heat exchanger 48, the accumulator 40, a compressor 42, and the indoor condenser 32 and returning to the outdoor heat exchanger 1 in the refrigerant flow direction as indicated by solid-line arrows in FIG. 1. The first check valve 46 is arranged in order to prevent a backflow of the refrigerant from a dedicated dehumidifying flow path 36h which will be described later to the outdoor heat exchanger 1.

On the other hand, a dehumidification operation flow path 36c in the refrigerant circuit 36 forms the same refrigerant flow path as the cooling operation flow path 36b flowing in order of the outdoor heat exchanger 1, the first check valve 46, the internal heat exchanger 48, a second expansion valve 50, the indoor evaporator 30, the second opening/closing valve 52, the internal heat exchanger 48, the accumulator 40, the compressor 42, the indoor condenser 32, and the first expansion valve 44 and returning to the outdoor heat exchanger 1 in the refrigerant flow direction as indicated by one-dot chain line arrows in FIG. 1.

Moreover, the dehumidification operation flow path 36c is divided at a dividing path 36e immediately after flowing out of the outdoor heat exchanger 1 and also forms the same refrigerant flow path as the heating operation flow path 36a flowing in order of the first opening/closing valve 38, the accumulator 40, the compressor 42, the indoor condenser 32, and the first expansion valve 44 and returning to the outdoor heat exchanger 1.

Furthermore, the dehumidification operation flow path 36c forms the dedicated dehumidifying flow path 36h flowing in order of the outdoor heat exchanger 1, the first check valve 46, the internal heat exchanger 48, the second expansion valve 50, the indoor evaporator 30, the second opening/closing valve 52, the internal heat exchanger 48, the accumulator 40, the compressor 42, and the indoor condenser 32 and then, divided at a dividing path 36f and flowing through a third opening/closing valve 54 and then, merging at a merging path 36g and finally reaching the accumulator 40.

On the other hand, the defrosting operation flow path (second flow path) 36d in the refrigerant circuit 36 forms a high-temperature refrigerant gas supply path 36j which is divided at the dividing path 36e immediately after flowing out of the outdoor heat exchanger 1 in the refrigerant flow direction indicated by two-dot chain line arrows in FIG. 1 and flowing in order of the first opening/closing valve 38, the accumulator 40, and the compressor 42 and then, divided at a dividing path 36i and flowing in order of a fourth opening/closing valve 56 and the second check valve 58 and returning to the outdoor heat exchanger 1.

The second check valve 58 is arranged in order to prevent a backflow of the refrigerant to the fourth opening/closing valve 56 side during heating, cooling, and dehumidification operations.

As described above, each of the flow paths 36a, 36b, and 36c during the heating, cooling, and dehumidification operations are shared flowing in order from the accumulator 40 through the compressor 42, the indoor condenser 32, and the first expansion valve 44 to the outdoor heat exchanger 1.

Moreover, the flow paths 36b and 36c during the cooling and dehumidification operations are shared flowing in order from the dividing path 36g through the internal heat exchanger 48, the second expansion valve 50, the indoor evaporator 30, the second opening/closing valve 52, and the internal heat exchanger 48 to the accumulator 40. Moreover, an outlet port 60 of the refrigerant from the outdoor heat exchanger 1 is provided on the header tank 12 on an upper side of the sub-cool core portion 10 of the outdoor heat exchanger 1, and the outlet port 60 is shared during the heating, cooling, dehumidification, and defrosting operations.

Moreover, an inlet port 62 of the refrigerant to the outdoor heat exchanger 1 is provided on the header tank 12 on the upper side of the main core portion 6, and the inlet port 62 is shared during the heating, cooling, dehumidification, and defrosting operations.

Each driving portion of the damper 34 and the first to fourth opening/closing valves 38, 52, 54, and 56 is electrically connected to an ECU (electric control unit), not shown, for comprehensively controlling the vehicle. The ECU opens the damper 34 during the heating operation using the heating operation flow path 36a or the dehumidification operation using the dehumidification operation flow path 36c so that the air blown from the blower fan 28 is introduced into the indoor condenser 32.

On the other hand, during the cooling operation using the cooling operation flow path 36b, the air blown from the blower fan 28 is introduced by bypassing the indoor condenser 32 by closing the damper 34. By operating the compressor 42 and by controlling opening/closing of the first to fourth opening/closing valves 38, 52, 54, and 56 as appropriate, any one of the heating operation, the cooling operation, the dehumidification operation, and the defrosting operation is performed.

In more detail, the ECU opens the first opening/closing valve 38 and closes the second to fourth opening/closing valves 52, 54, and 56 during the heating operation.

On the other hand, during the cooling operation, the first opening/closing valve 38 is closed, an evaporation pressure of a refrigerant gas gasified in the indoor evaporator 30 is adjusted as appropriate by adjusting an opening degree of the second opening/closing valve 52, and the third and fourth opening/closing valves 54 and 56 are closed. On the other hand, during the dehumidification operation, the first opening/closing valve 38 is opened, the evaporation pressure of the refrigerant gas gasified in the indoor evaporator 30 is adjusted as appropriate by adjusting the opening degree of the second opening/closing valve 52, the opening degree of the third opening/closing valve 54 is adjusted as appropriate, and the fourth opening/closing valve 56 is closed.

On the other hand, during the defrosting operation, the first and fourth opening/closing valves 38 and 56 are opened, and the second and third opening/closing valves 52 and 54 are closed so that the high-temperature refrigerant gas is supplied to the outdoor heat exchanger 1.

The refrigerant flowing into the main core portion 6 through the inlet port 62 during the heating, cooling, dehumidification, and defrosting operations repeats a down-flow or up-flow vertical flow in the same direction with a plurality of partition plates 64 partitioning an inside of each of the header tanks 12 as boundaries, performs heat exchange with the ambient air by the ventilation to the main core portion 6 and flows from right to left as a whole when seen in FIGS. 1 and 2.

On a left end of the header tank 12 on the lower side of the main core portion 6, a main core portion outlet port 66 of the refrigerant is provided, and to the main core portion outlet port 66, a first common flow path (first flow path, second flow path) 68 shared as a part of each of the flow paths 36a, 36b, and 36c during the heating, cooling, and defrosting operations is connected.

Moreover, on the header tank 12 on the lower side of the sub-cool core portion 10, a sub-cool core portion inlet port 70 of the refrigerant is provided, and to the sub-cool core portion inlet port 70, a second common flow path (second flow path) 72 shared as a part of each of the flow paths 36a and 36c during the heating and dehumidification operations is connected.

Moreover, on a lower end of the receiver tank 8, a connecting member 74 constituted by one member is provided. In the connecting member 74, an inter-tank communication hole (first communication hole) 76 causing an inside of the receiver tank 8 to communicate with an inside of the header tank 12 on the lower side and a cooling communication hole (second communication hole) 80 to which a cooling-only flow path (first flow path) 78 used as a part of the cooling operation flow path 36b is connected are drilled.

These first common flow path 68, second common flow path 72, and the cooling-only flow path 78 are connected to an inlet port 82a, a first outlet port 82b, and a second outlet port 82c of a three-way valve (flow-path switching means) 82 electrically connected to the ECU, respectively.

Flow-path switching control by the three-way valve 82 will be described below in detail. First, during the heating operation of the heat pump system 2, the refrigerant flowing into the main core portion 6 from the inlet port 62 repeats a down-flow or up-flow vertical flow with the partition plate 64 of each of the header tanks 12 as a boundary and flows from right to left as a whole as illustrated by the broken-line arrows in FIG. 1 while performing heat exchange with the ambient air by ventilation to the main core portion 6 and flows out of the main core portion outlet port 66 to the first common flow path 68.

When the three-way valve 82 is switched to a direction in which the first outlet port 82b is opened, the inlet port 82a is made to communicate with the first outlet port 82b, and the refrigerant of the first common flow path 68 flows through the first common flow path 68 and flows into the sub-cool core portion 10 from the sub-cool core portion inlet port 70. The refrigerant having flowed into the sub-cool core portion 10 has its heat further absorbed by heat exchange with the ambient air by the ventilation to the sub-cool core portion 10 during the up-flow vertical flow and is made to flow out of the outlet port 60 to the refrigerant circuit 36. As described above, the refrigerant during the heating operation bypasses the receiver tank 8 in the outdoor heat exchanger 1 and flows through the main core portion 6 and the sub-cool core portion 10 in order. The refrigerant flow in the outdoor heat exchanger 1 during the dehumidification and defrosting operations is similar to that during the heating operation.

On the other hand, during the cooling operation of the heat pump system 2, the refrigerant having flowed into the main core portion 6 from the inlet port 62 repeats down-flow or up-flow as described above, flows from right to left as a whole as indicated by the solid-line arrows in FIG. 1 while performing heat exchange with the ambient air by the ventilation to the main core portion 6 and flows out of the main core portion outlet port 66 to the first common flow path 68.

When the three-way valve 82 is switched to a direction in which the second outlet port 82c is opened, the inlet port 82a is made to communicate with the second outlet port 82c, and the refrigerant of the first common flow path 68 flows through the second common flow path 68 and flows into the receiver tank 8 through the cooling communication hole 80 of the connecting member 74. The refrigerant having flowed into the receiver tank 8 flows through the inter-tank communication hole 76 and flows into the header tank 12 on the lower side of the sub-cool core portion 10 and into the sub-cool core portion 10.

The liquid refrigerant having flowed into the sub-cool core portion 10 is subjected to heat exchange with the ambient air by the ventilation to the sub-cool core portion 10 in the up-flow vertical flow and is sub-cooled and then, flows out of the outlet port 60 to the refrigerant circuit 36. As described above, in the outdoor heat exchanger 1, the refrigerant during the cooling operation flows through the main core portion 6, the receiver tank 8, and the sub-cool core portion 10 in order.

As described above, in this embodiment, by switching the three-way valve 82, during the heating and dehumidification operations and during the defrosting operation using the outdoor heat exchanger 1 as the evaporator, the refrigerant flows in order of the main core portion 6 and the sub-cool core portion 10 by bypassing the receiver tank 8 in the outdoor heat exchanger 1. Moreover, during the cooling operation using the outdoor heat exchanger 1 as the condenser, the refrigerant flows through the main core portion 6, the receiver tank 8, and the sub-cool core portion 10 in order in the outdoor heat exchanger 1.

Here, in the invention of the present application, during the heating and dehumidification operations using the outdoor heat exchanger 1 as the evaporator, gas/liquid separation of the refrigerant by the receiver tank 8 is not necessary in the first place, and the pressure loss of the refrigerant caused by flowing of the refrigerant through the sub-cool core portion 10 pays attention to a fact that the loss is the largest when the refrigerant flows through the receiver tank 8. During the heating and dehumidification operations, by bypassing only the receiver tank 8 in the outdoor heat exchanger 1 and by allowing the refrigerant to flow in order of the main core portion 6 and the sub-cool core portion 10, the pressure loss involved in fluidity of the refrigerant can be effectively suppressed while the heat absorption area from the refrigerant to the outside air in the sub-cool core portion 10 is ensured, and thus, the heat exchange efficiency of the outdoor heat exchanger 1 during the heating and dehumidification operations can be largely improved.

Moreover, the receiver tank 8 is formed of a material with large heat capacity such as aluminum or the like in general in order to efficiently liquefy the refrigerant, and when the high-temperature refrigerant gas flows through the receiver tank 8 at a low temperature during the defrosting operation, for example, a heat energy loss of the refrigerant in the receiver tank 8 becomes remarkable. However, in the case of this embodiment, this can be avoided by bypassing the receiver tank 8 in the outdoor heat exchanger 1 during the defrosting operation and thus, the heat energy loss in defrosting is reduced, which contributes to further improvement of the heat exchange efficiency of the outdoor heat exchanger 1.

Moreover, by making the flow directions of the refrigerants the same in the main core portion 6 and the sub-cool core portion 10 in each of the flow paths 36a, 36b, 36c, and 36d during the heating, cooling, dehumidification, and defrosting operations, circuit configurations of the outdoor heat exchanger 1 and the refrigerant circuit 36 in which the outdoor heat exchanger 1 is incorporated can be largely simplified.

Specifically, if the flow direction of the refrigerant in the heat exchange core of the main core portion 6 and the sub-cool core portion 10 is reversed between the heating and dehumidification operations using the outdoor heat exchanger 1 as the evaporator and the cooling operation using the outdoor heat exchanger 1 as the condenser, the numbers of pipes and valves dedicated for each of the operations inevitably increase in the refrigerant circuit 36, and the circuit configuration is complicated. Moreover, if the number of dedicated pipes increases, a total pipeline length of the refrigerant circuit 36 is prolonged, and a refrigerant sealed amount of the refrigerant circuit 36 increases, which causes deterioration of the heat exchange efficiency of the outdoor heat exchanger 1, but these can be avoided in the case of this embodiment.

Moreover, if the flow direction of the refrigerant in the heat exchange core is reversed, the number of circuit switching points in the refrigerant circuit 36 increases and thus, a low-pressure side circuit and a high-pressure side circuit of the refrigerant can be easily generated before and after the valve. Thus, opening/closing and switching of the valve cannot be performed until a differential pressure before and after the valve in the pipeline is lowered to a differential pressure capable of valve operation, and there is concern that a time lag occurs in switching control of the refrigerant circuit 36, but in the case of this embodiment, this can be avoided.

Moreover, if the flow direction of the refrigerant in the heat exchange core is reversed, the inlet and outlet port of the refrigerant with respect to the outdoor heat exchanger 1 is used also as a refrigerant inlet and a refrigerant outlet. Therefore, a pipeline diameter to be connected to these inlet and outlet port needs to be matched with a diameter on a large-diameter side, and the diameter of the pipeline constituting the refrigerant circuit 36 should be enlarged as a whole, but this can be avoided in the case of this embodiment.

Moreover, the tubes 14 of the main core portion 6 and the sub-cool core portion 10 extend in the vertical direction, and the refrigerant flows in the vertical flow direction and thus, water drops can easily collect on the surface of the tubes 14. Therefore, occurrence of frosting and icing phenomena in the tubes 14 can be suppressed, and deterioration of the heat exchange efficiency between the air and the refrigerant in the main core portion 6 and the sub-cool core portion 10 can be suppressed.

Moreover, when frost is formed on the tube 14, it is defrosted by heat of the high-temperature refrigerant by changing the heat pump system 2 to the defrosting operation, and the water drops generated on the surface of the tube 14 after defrosting can be efficiently removed by dropping them down along the tube 14 by the gravity.

Furthermore, even if the outdoor heat exchanger 1 is exposed to a low-temperature atmosphere after the defrosting operation is finished or the low-temperature refrigerant is made to flow through the outdoor heat exchanger 1, since the water drops generated on the surface of the tube 14 have been removed, icing on the tube 14 can be also suppressed, and the heat exchange efficiency of the outdoor heat exchanger 1 can be effectively maintained.

Moreover, by integrally constituting the main core portion 6 and the sub-cool core portion 10 adjacent to each other, the outdoor heat exchanger 1 can be constituted compactly, manufacture of the outdoor heat exchanger 1 can be facilitated, the component cost can be reduced, and the structure of the outdoor heat exchanger 1 can be simplified.

Moreover, by providing the connecting member 74 having the inter-tank communication hole 76 and the cooling communication hole 80 in the receiver tank 8, the header tank 12 and the cooling-only flow path 78 can be made to communicate with the receiver tank 8 by the one member, and thus, manufacture of the outdoor heat exchanger 1 can be further facilitated, the component cost can be further reduced, and the structure of the outdoor heat exchanger 1 can be further simplified.

The present invention is not limited to the above-described embodiment but is capable of various variations.

For example, the number of paths of the main core portion 6 and the sub-cool core portion 10 can be changed as appropriate.

Moreover, the constitution of the outdoor heat exchanger 1 is not limited to the above-described embodiment as long as, during the heating and dehumidification operation using the outdoor heat exchanger 1 as the evaporator, the receiver tank 8 is bypassed in the outdoor heat exchanger 1 and the refrigerant is made to flow through the main core portion 6 and the sub-cool core portion 10 in order.

Specifically, by arranging the main core portion 6 and the sub-cool core portion 10 along the left-and-right direction between the left and right header tanks arranged, respectively, along the left-and-right direction, the outdoor heat exchanger 1 may be constituted by a plurality of the tubes communicating with both the left and right header tanks and the fin arranged between the adjacent tubes. In this case, too, during the heating and dehumidification operations, the pressure loss involved in fluidity of the refrigerant can be effectively suppressed while the heat absorbing area from the refrigerant to the outside air in the sub-cool core portion 10 is ensured, and thus, the heat exchange efficiency of the outdoor heat exchanger 1 can be largely improved.

Moreover, the outdoor heat exchanger 1 of the above-described embodiment can be applied also to the heat pump system 2 performing only the heating and cooling operations without performing the dehumidification and defrosting operations.

Moreover, in this embodiment, the present invention is described for the use in the outdoor heat exchanger 1 provided outside the HVAC unit 4 for vehicle air-conditioning, but it can be also applied to the heat exchangers and the heat pump systems of other applications. However, by using the outdoor heat exchanger 1 for the air-conditioning device for a vehicle, the defrosting operation with high energy efficiency as described above can be realized, which is suitable.

EXPLANATION OF REFERENCE SIGNS 1 outdoor heat exchanger (heat exchanger)
2 heat pump system
6 main core portion
8 receiver tank
10 sub-cool core portion
12 header tank 14 tube
16 fin
36a heating operation flow path (second flow path)
36b cooling operation flow path (first flow path)
36d defrosting operation flow path (second flow path)
68 first common flow path (first flow path, second flow path)
72 second common flow path (second flow path)
74 connecting member
76 inter-tank communication hole (first communication hole)
78 cooling-only flow path (first flow path)
80 cooling communication hole (second communication hole)
82 three-way valve (flow-path switching means)

The invention claimed is:

1. A heat pump system for an air-conditioning device for a vehicle comprising an outdoor heat exchanger used as a condenser or an evaporator, an indoor evaporator and an indoor condenser, the outdoor heat exchanger comprising:
   a main core portion for performing heat exchange between air and a refrigerant;
   a receiver tank into which the refrigerant having flowed through the main core portion flows;
   a sub-cool core portion for sub-cooling a liquid refrigerant having flowed through the receiver tank by heat exchange with the air;
   a first flow path through which the refrigerant is made to flow in order of the main core portion, the receiver tank, the sub-cool core portion, the indoor evaporator, and the indoor condenser;
   a second flow path through which the refrigerant is made to flow in order of the main core portion, the sub-cool core portion, and the indoor condenser by bypassing the receiver tank; and
   a flow-path switching means for switching between the first flow path and the second flow path,
   wherein when the outdoor heat exchanger is used as a condenser, the refrigerant is made to flow through the first flow path by the flow-path switching means,
   wherein when the outdoor heat exchanger is used as an evaporator, the refrigerant is made to flow through the second flow path by the flow-path switching means, and
   wherein when the main core portion and the sub-cool core portion are to be defrosted, the refrigerant is made to flow through the second flow path by the flow-path switching means, and when the main core portion and the sub-cool core portion do not require defrosting, the refrigerant is made to flow through the first flow path by the flow-path switching means.

2. The heat pump system according to claim 1, wherein flow directions of the refrigerant in the main core portion and the sub-cool core portion of the first flow path and the second flow path are the same.

3. The heat pump system according to claim 2, wherein each of the main core portion and the sub-cool core portion has:
   a pair of header tanks arranged away from each other in a vertical direction;
   a plurality of tubes arranged so as to extend in the vertical direction between the header tanks and to cause the pair of header tanks to communicate with each other; and
   a fin provided in the outdoor heat exchanger.

4. The heat pump system according to claim 3, wherein the main core portion and the sub-cool core portion are arranged adjacent to each other.

5. The heat pump system according to claim 4, wherein the receiver tank includes one connecting member having a first communication hole made to communicate with the header tank and a second communication hole made to communicate with the first flow path.

* * * * *